United States Patent
Massbaum et al.

(10) Patent No.: US 11,390,040 B2
(45) Date of Patent: Jul. 19, 2022

(54) METHOD FOR SEALING A SEAM REGION, AND PLASTIC SKIN

(71) Applicant: Frimo Group GmbH, Lotte (DE)

(72) Inventors: Oliver Massbaum, Lotte (DE); Jürgen Bäumker, Lotte (DE)

(73) Assignee: FRIMO GROUP GMBH, Lotte (DE)

( * ) Notice: Subject to any disclaimer, the term of this patent is extended or adjusted under 35 U.S.C. 154(b) by 1014 days.

(21) Appl. No.: 16/075,826

(22) PCT Filed: Feb. 15, 2017

(86) PCT No.: PCT/EP2017/053379
§ 371 (c)(1),
(2) Date: Aug. 6, 2018

(87) PCT Pub. No.: WO2017/140714
PCT Pub. Date: Aug. 24, 2017

(65) Prior Publication Data
US 2021/0187869 A1    Jun. 24, 2021

(30) Foreign Application Priority Data
Feb. 19, 2016   (DE) .......................... 102016202592.9

(51) Int. Cl.
| B29C 44/14 | (2006.01) |
| B29C 65/20 | (2006.01) |
| B29C 65/72 | (2006.01) |
| B29K 627/06 | (2006.01) |
| B29K 675/00 | (2006.01) |
(Continued)

(52) U.S. Cl.
CPC .............. *B29C 65/72* (2013.01); *B29C 44/14* (2013.01); *B29C 65/02* (2013.01); *B29C 65/20* (2013.01);
(Continued)

(58) Field of Classification Search
CPC ....... B29C 44/14; B29C 44/351; B29C 65/02; B29C 65/10; B29C 65/1412; B29C 65/16;
(Continued)

(56) References Cited

U.S. PATENT DOCUMENTS 2,247,570 A * 7/1941 Clayton ................... D05B 1/06
112/200
3,296,990 A * 1/1967 Simjian ................... B29C 66/43
112/475.01
(Continued)

FOREIGN PATENT DOCUMENTS

DE    10 2007 055 140 A1    5/2009
DE    10 2012 009 971 A1    11/2013
(Continued)

OTHER PUBLICATIONS

International Search Report and Written Opinion for International Application No. PCT/EP2017/053379, dated May 12, 2017.
(Continued)

*Primary Examiner* — Michael A Tolin
(74) *Attorney, Agent, or Firm* — Wolf, Greenfield & Sacks, P.C.

(57) ABSTRACT

The invention relates to a method by which stitch openings in the area of a seam in a plastic skin (10), in particular a PVC or TPU skin, are sealed, said PVC or TPU skin being provided for a foamed part. Foamed parts of this type are used especially as interior fitting parts, e.g. as a dashboard, in the field of automobile manufacturing. The invention further relates to a PVC or TPU skin comprising a seam of said type.

10 Claims, 2 Drawing Sheets

(51) Int. Cl.
  *D05B 17/00* (2006.01)
  *B29C 65/02* (2006.01)
  *B29C 65/00* (2006.01)
  *B29L 31/30* (2006.01)
  *B29K 21/00* (2006.01)
  *B29K 75/00* (2006.01)

(52) U.S. Cl.
  CPC .............. *B29C 66/71* (2013.01); *D05B 17/00* (2013.01); *B29K 2021/003* (2013.01); *B29K 2075/00* (2013.01); *B29K 2627/06* (2013.01); *B29K 2675/00* (2013.01); *B29L 2031/3005* (2013.01)

(58) Field of Classification Search
  CPC ......... B29C 65/18; B29C 65/20; B29C 65/62; B29C 65/72; B29C 66/034; B29C 66/1122; B29C 66/21; B29C 66/47; B29C 66/532; B29C 66/69; B29C 66/71; B29C 67/004; B29C 69/00; B29K 2021/003; B29K 2027/06; B29K 2075/00; B29K 2627/06; B29K 2675/00; B29K 2705/00; B29L 2031/3005; B29L 2031/3008; B29L 2031/3014; D05B 17/00; D05D 2305/26
  See application file for complete search history.

(56) References Cited

U.S. PATENT DOCUMENTS

| | | | | |
|---|---|---|---|---|
| 4,562,025 A | * | 12/1985 | Gray | B29C 41/18 |
| | | | | 264/126 |
| 7,601,414 B2 | * | 10/2009 | Handermann | B32B 5/245 |
| | | | | 428/102 |
| 7,851,039 B2 | * | 12/2010 | Boinais | B32B 27/18 |
| | | | | 428/103 |
| 2013/0048219 A1 | * | 2/2013 | Ferreiro | B29C 65/7437 |
| | | | | 156/513 |
| 2015/0321449 A1 | | 11/2015 | Filipp | |
| 2017/0342256 A1 | * | 11/2017 | Iwabuchi | B32B 27/30 |

FOREIGN PATENT DOCUMENTS

| DE | 10 2015 106 964 A1 | 11/2015 |
|---|---|---|
| FR | 886 765 A | 10/1943 |
| FR | 2 813 774 A1 | 3/2002 |

OTHER PUBLICATIONS

International Preliminary Report on Patentability for International Application No. PCT/EP2017/053379, dated Aug. 30, 2018.

\* cited by examiner

METHOD FOR SEALING A SEAM REGION, AND PLASTIC SKIN

RELATED APPLICATIONS

This Application is a national stage filing under 35 U.S.C. 371 of international application number PCT/EP2017/053379, filed Feb. 15, 2017, and claims the benefit under 35 U.S.C. § 119(e) of German application number 102016202592.9, filed Feb. 19, 2016, each of which is herein incorporated by reference in its entirety.

TECHNICAL FIELD

The present invention relates to a method by means of which stitch openings in the area of a seam in a plastic skin, in particular a PVC (polyvinyl chloride) or TPU (thermoplastic polyurethane (slush) skin, are sealed, said PVC or TPU skin being provided for a foamed part. Such foamed parts are used in particular as interior fitting parts, for example as a dashboard, door panels, centre consoles, in the field of automobile manufacturing. The present invention furthermore relates to a PVC or TPU skin comprising such a seam.

PRIOR ART

It is already known to incorporate a seam (thread/yarn) in a plastic skin in order to positively influence the optical design of such a skin. A skin is first of all provided with such a yarn, is then placed in a foaming tool and is connected to a dimensionally stable carrier during a foaming process.

Since the cited skins imitate, for example, a leather look on their visible side, real seams further enhance the imitation leather produced in this manner since a seam region such as would be expected, for example, for connecting separate leather skins is suggested to the observer.

However, complications often occur in the region of the seam during the foaming process since if the stitch openings are not sufficiently sealed by the respective yarn section, the foam material could escape during the foaming process towards the visible side of the skin through the stitch openings via which the yarn passes through the PVC or TPU skin. Such quality defects are not acceptable and would lead to high reject rates.

Various measures have therefore already been taken in the prior art in order to seal, prior to the foaming process, the stitch openings that occur when incorporating the seam.

For example, the document US 2013/0260086 A1 is known, which relates to a foam-filled panel with a decorative seam. The stitches can thereby be sealed in order to prevent the foam from escaping when it is injected between a carrier and a skin. US 2013/0260086 A1 proposes sealing the stitches by adhesively attaching a membrane along the length of the stitches, thereby covering the openings. As a further alternative measure, it is proposed to use an expandable yarn. The yarn can thereby increase its diameter under the influence of moisture. The stitches are sealed in this manner.

A further known document is DE 10 2014 107 108 A1, which shows a method for equipping a multi-layered moulded body with an ornamental seam. The moulded body has at least one core part and a cover part. The effective region of a tool is thereby supposed to be introduced at least partially through the cover part into the core part, with a seam region of the yarn material being arranged in the effective region. The effective region of the tool is furthermore supposed to be removed from the moulded body such that the seam region remains in the core part and a connection is activated between the core part and the seam region in such a manner that a maintaining of the position of the seam region in the core part is ensured. The core material can comprise a heat-activated connecting portion, in particular a heat-activated hot-melt adhesive, with the activation of the connection between the core part and the seam region occurring by heating at least the core part. In one embodiment, the heat-activated connecting portion is provided, at least prior to activation of the connection, as a coating on the yarn material, and in a further embodiment, the heat-activated connecting portion is woven, at least prior to the activation of the connection, into the yarn material as yarn.

The document DE 10 2015 106 964 A1 is furthermore known, which shows an interior panel with sealed stitched seams. The sewing needle holes are thereby sealed by means of an elastomeric material before a foam layer is formed on the non-visible side of the cover layer to prevent the expanding foam from leaking through the needle holes and becoming visible on the visible side of the panel. The elastomeric material is initially applied as a viscous liquid formulated to solidify and can be applied by spraying, which allows lines of stitching to be located along complex contours of the panel. For example, a latex emulsion is one suitable type of such a viscous liquid.

SUBJECT MATTER OF THE INVENTION

An object of the present invention is to provide a simple and inexpensive method for sealing stitch openings in a plastic skin, in particular a PVC or TPU skin.

The subject matter of claim 1 is such a method. Further preferred embodiments are specified in the dependent claims.

The present invention provides a method for sealing stitch openings in the seam region of a plastic skin, in particular a PVC or TPU (slush) skin (polyvinyl chloride or thermoplastic polyurethane). The stitch openings thereby preferably extend substantially perpendicular to and through the rear side of the plastic skin, with a yarn passing through the stitch openings.

The method comprises the following steps: Providing a plastic skin having a visible side and a rear side and provided with at least one yarn, namely in such a manner that the rear side of the plastic skin is accessible, and warming, heating or melting the rear side of the plastic skin in the seam region such that the plastic skin contacts the yarn in the region of the stitch openings. The plastic skin has, for example, a grained surface on the visible side.

The term "yarn" is used within the scope of the present invention. The term "yarn" conceptually includes a thread in this context. The expression "thread" can also replace the term "yarn". The yarn/thread can be woven, knitted, knit or tufted from a plurality of fibres.

The method according to the invention can be used for processing a plastic skin that is used for a panel component for an automobile. The use of a skin processed in this manner is, however, not limited to the automotive field. It could rather be panel components in general, purely as an example for the interior of an aircraft.

The plastic skin is preferably a so-called slush skin. Slush skins are produced from a plastic material in a primary shaping process. Within the scope of the invention, PVC or TPU is preferably used as the plastic material.

The method according to the invention has the advantage that owing to local thermal influences, the stitch openings resulting when the yarn is incorporated in the skin are securely sealed. It was thereby found that even a local heating, for example by means of a flame or by means of hot air, leads to a permanent deformation of the skin in the seam region, and thus the skin contacts the yarn and, in the case of higher temperatures, is possibly adhered thereto without having to apply an additional sealant or a cover film in the seam region. Since no further auxiliary means besides a device for causing a thermal influence are required, the method for sealing a seam region can be greatly simplified. This applies in particular in the case of PVC or TPU skins, which become temporarily elastic owing to the thermal influence (warming/heating) and can thus contact the yarn passing through the stitch opening.

According to one embodiment, it is preferred that the warming/heating of the plastic skin is carried out by means of a heating device, with a relative movement being provided between the heating device and the skin. It is possible in this manner to achieve a sealing of stitch openings with consistent quality. According to one alternative, the heating device is moved whilst the plastic skin is kept stationary.

It is preferred in this regard that the heating device is a gas burner, an electric heat source or a hot air source. A gas burner, an electric heat source and a hot air source allow a relatively accurate dosing of the heat to be applied to the plastic skin. A gas burner furthermore has the advantage that the heat input region is visually perceptible and it can thus be recognised during the procedure whether a sufficiently large area is being subjected to a thermal influence. A hot air source is a relatively cost-effective heating device that is extremely reliable during use, for the operation of which merely electrical energy must be supplied.

A pressure roller with a heat source or a pressure pad with a heat source can alternatively also be used. These devices have the advantage that in addition to heat, pressure is also exerted on the skin at the same time, and thus a mechanically induced deformation occurs.

As a further possibility, an infrared source, a heating element or heating plate or a laser may be used. These allow a particularly precise process control.

It is preferred for the at least one yarn to be a heat-resistant or fire-resistant yarn. In this manner, the yarn is reliably prevented from being severed at the rear side of the plastic skin as a result of the method step of heating.

According to a further embodiment of the present invention, it is provided that during the step of preparing the plastic skin, the plastic skin is placed visible side down on a flat support, in particular a machine bench. An extremely reliable process control is possible in this manner.

According to a further alternative, the plastic skin is placed, for example, in a foaming tool. A foaming process can thus be carried out following sealing of the seam region.

In particular, when heating the rear side of the plastic skin in the seam region, the skin is at least partially melted. Owing to the local melting of the plastic skin, in particular a skin made of PVC (polyvinyl chloride), a deformation hereof is achieved such that any slits possibly present between the plastic skin and the yarn in the region of the stitch openings can be sealed.

According to one alternative of the present invention, the plastic skin is provided with two yarns spaced apart from one another which define a common seam region, with the heating of the rear side of the plastic skin in the common seam region being carried out in a single pass. A so-called decorative seam, which comprises two yarns extending in parallel, can thus be rapidly processed using the method according to the invention.

The present invention furthermore relates to a method for producing an interior panel component for an automobile using a plastic skin produced according to one of the embodiments described above.

It is preferred that when heating the rear side of the plastic skin in the seam region, or subsequent thereto, a mechanical influence is exerted in the seam region, in particular by means of a pressure roller or a pressure pad. The sections of the plastic skin that are more elastic or have been melted owing to heating can be additionally deformed in this manner in order to seal the seam region.

The pressure effect can, as already explained, thereby be effected by a combined pressure roller/pressure pad having a heat source or alternatively by separate devices, in particular a pressure roller/pressure pad and a heating device such as a gas burner, a hot air source, an infrared source, a heating element, a soldering iron or a laser.

It is further preferred to heat a surface area of the plastic skin to a temperature of at least 80° C., preferably at least 100° C. A temperature of at least 110° C. can, for example, be selected at least in sections of the seam region. The heated region becomes elastic in this manner in order to contact the yarn.

According to one object of the present invention, it is hereby possible to subject the plastic skin to the above-described process immediately prior to the process for producing the interior panel component. It is in particular possible to insert a plastic skin provided with a yarn in a tool for producing the interior panel component and subject it therein to the method according to the invention for sealing a seam region of a plastic skin. A relatively short processing time can be ensured in this manner.

According to another aim of the invention, the method for sealing a seam region of a plastic skin and the method for producing an interior panel component using such a plastic skin are carried out separately from one another in terms of both space and time.

The present invention furthermore relates to a PVC or TPU skin, preferably a PVC or TPU skin, having a visible side and a rear side, the visible side having a grained surface and the PVC or TPU skin having a seam region with a yarn, which yarn penetrates though the PVC or TPU skin in sections, with melted and resolidified sections of the PVC or TPU skin being present in the seam region such that the PVC or TPU skin contacts the yarn in the region of the stitch openings.

Such a PVC or TPU skin that is produced in particular using a method according to one of the aforementioned embodiments can have further features already cited above. The PVC or TPU skin can in particular be provided with a fire-resistant yarn.

DETAILED DESCRIPTION OF THE PREFERRED EMBODIMENTS

A preferred embodiment of the present invention is described in detail below by means of the enclosed figures.

Further modifications of certain features cited in this context can each be individually combined to form new embodiments.

Figure 1:
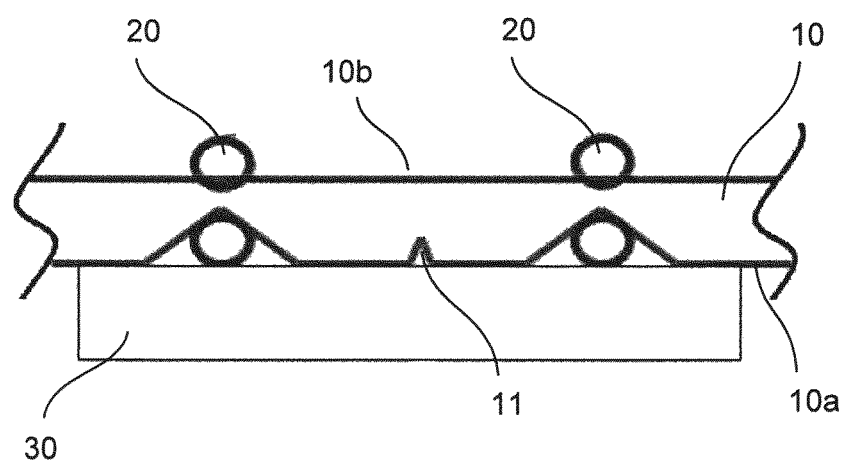
FIG. 1 is a schematic cross-section view of a region of a PVC skin, in which a yarn has been incorporated.
Figure 2:
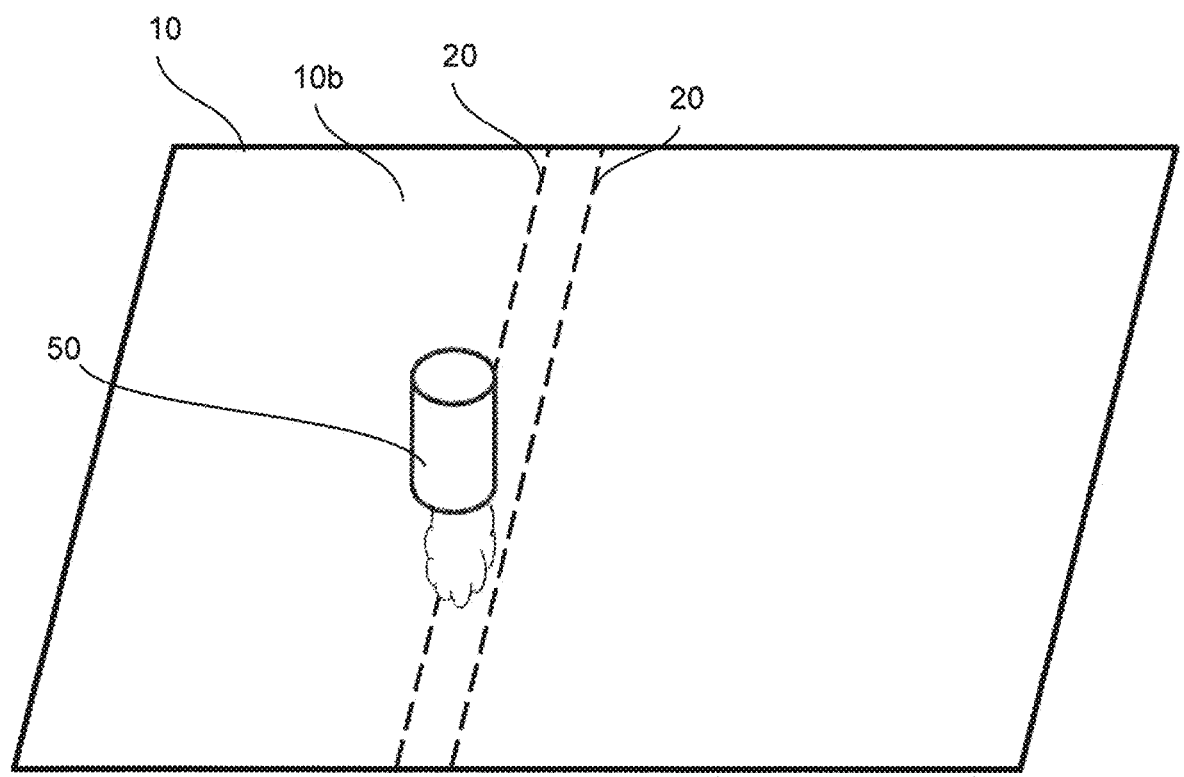
FIG. 2 is a perspective top view of an under side of a skin with an incorporated yarn.

The cross-section shown in FIG. 1 schematically shows a seam region of a PVC or TPU slush skin 10 (also referred to as "skin" in the following within the scope of the present embodiment). The skin 10 comprises a visible side 10a, which is normally provided with a grain pattern, for example so as to imitate a leather surface, as well as a rear side 10b. The rear side 10b forms the non-visible inner side in a foamed component provided with a skin 10.

In the described embodiment, yarns 20 are sewn into the skin 10 at a certain distance to one another, which penetrate the skin 10 along its progression through stitch openings alternately from the visible side 10a to the rear side 10b and vice versa. The yarns 20 are thereby formed from a fire-resistant material or a material with low flammability. A groove 11 is furthermore provided on the visible side 10a of the skin 10 (at the bottom of FIG. 1), in the region of which the skin 10 has a depression in order to imitate a connecting region between two pieces of skin.

During the method according to the invention, the skin 10 is placed on a support 30 with its visible side 10a facing down such that the rear side 10b of the skin 10, which comes into contact with the foamed material (preferably polyurethane) or a thermoplastic elastomer during a later foaming process, is accessible.

In order to seal the stitch openings of the seams, a local thermal influence is now exerted by means of a heating device 50. In the present embodiment, this thermal influence is exerted by means of a flame, a soldering iron or by means of hot air. The heating device 50 is accordingly configured as a gas burner, a soldering iron or a hot air blower.

For this purpose, a heating device 50 is guided along the seam region of the skin 10, thereby heating the skin 10 in this region. Owing to the heating, a temporary softening of the skin 10 in the seam region occurs, such that the skin 10 contacts the yarn 20 and thus seals the stitch openings.

It is also possible according to a further modification to use a combined pressure and heating device, for example a pressure roller/pressure pad with a heat source.

It is also possible to first of all heat the seam region and then, whilst the skin 10 in the seam region is at least partially still in the heated state, to apply pressure.

The skin 10 can thereby be heated to at least 80° C., preferably at least 100° C., further preferred at least 120° C. A maximum temperature range is, for example, 2000° C.

Once the skin has cooled, it remains in this state so that during a subsequent foaming process, during which the skin 10 is connected to a dimensionally stable carrier by means in particular of polyurethane, no foam material can penetrate to the visible side.

Even though it is preferred according to the described preferred embodiment that the skin 10 is placed on a support arranged so as to be stationary and that the heating device 50 is moved, it is possible according to another alternative to place the skin 10 on a moveable support (moveable table) and to bring about a relative movement between the skin 10 and the heating device in this manner. Furthermore, according to another alternative, both the support with the skin and the heating device can be moved.

The invention claimed is:

1. Method for processing a plastic skin with a seam region, the plastic skin comprising a PVC slush skin or TPU slush skin, with stitch openings being present in the plastic skin in the seam region owing to the incorporation of a yarn in the plastic skin, comprising:
   providing the plastic skin, wherein the plastic skin has a visible side and a rear side and is provided with at least one yarn such that the rear side of the plastic skin is accessible;
   heating only the rear side of the plastic skin in the seam region such that the plastic skin contacts the at least one yarn in a region of the stitch openings present in the plastic skin and such that the seam region is sealed; and
   placing foam adjacent the rear side of the plastic skin.

2. Method according to claim 1, characterised in that the heating of only the rear side of the plastic skin is carried out by means of a heating device and comprises providing a relative movement between the heating device and the rear side of the plastic skin.

3. Method according to claim 2, characterised in that the heating device is a gas burner, a hot air heater, an infrared heater, a heating element, a soldering iron, a heated pressure roller or heated pressure pad, or a laser.

4. Method according to claim 1, characterised in that the at least one yarn comprises a fire-resistant material.

5. Method according to claim 1, further comprising a step of preparing the plastic skin, wherein the plastic skin is placed visible side facing down on a support, wherein the support comprises a machine table, or in one half of a foaming tool.

6. Method according to claim 1, characterised in that when heating only the rear side of the plastic skin in the seam region, the plastic skin is at least partially melted.

7. Method according to claim 1, characterised in that the plastic skin is provided with two yarns spaced apart from one another which define a common seam region, with the heating of only the rear side of the plastic skin comprising heating only the rear side of the plastic skin in the common seam region and being carried out in a single pass.

8. Method according to claim 1, characterised in that the stitch openings present in the plastic skin extend substantially perpendicular to and through the rear side of the plastic skin.

9. Method according to claim 1, characterised in that the plastic skin in the seam region is heated at least in parts to a temperature of at least 80° C., at least 100° C., or at least 110° C.

10. Method according to claim 1, characterised in that when heating only the rear side of the plastic skin in the seam region, or subsequent thereto, pressure is exerted on the plastic skin in the seam region, by means of a pressure roller or a pressure pad.

* * * * *